United States Patent
Matsumura (10) Patent No.: US 9,849,725 B2
(45) Date of Patent: Dec. 26, 2017

(54) HEAVY LOAD PNEUMATIC RADIAL TIRE WITH CAP TREAD RUBBER, BASE TREAD RUBBER, AND REINFORCING RUBBER LAYER

(71) Applicant: BRIDGESTONE CORPORATION, Chuo-ku, Tokyo (JP)

(72) Inventor: Hiroyuki Matsumura, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 651 days.

(21) Appl. No.: 14/353,300

(22) PCT Filed: Oct. 25, 2012

(86) PCT No.: PCT/JP2012/006870
§ 371 (c)(1),
(2) Date: Apr. 22, 2014

(87) PCT Pub. No.: WO2013/061602
PCT Pub. Date: May 2, 2013

(65) Prior Publication Data
US 2014/0311647 A1     Oct. 23, 2014

(30) Foreign Application Priority Data
Oct. 25, 2011  (JP) ................................ 2011-234308

(51) Int. Cl.
*B60C 9/18*     (2006.01)
*B60C 11/00*    (2006.01)
(Continued)

(52) U.S. Cl.
CPC .............. *B60C 1/00* (2013.01); *B60C 9/1835* (2013.01); *B60C 9/20* (2013.01); *B60C 11/03* (2013.01);
(Continued)

(58) Field of Classification Search
CPC . B60C 9/1835; B60C 11/005; B60C 11/0075; B60C 2001/0075;
(Continued)

(56) References Cited

U.S. PATENT DOCUMENTS 1,769,694 A * 7/1930 Jenkinson .............. B60C 11/005
4,349,061 A * 9/1982 Hirakawa .............. B60C 11/005
152/209.5

(Continued)

FOREIGN PATENT DOCUMENTS

| CN | 1646334 A | 7/2005 |
| CN | 1994763 A | 7/2007 |

(Continued)

OTHER PUBLICATIONS

English machine translation of DE 198 50 766 A1, May 18, 2000.*
(Continued)

*Primary Examiner* — Adrienne C Johnstone
(74) *Attorney, Agent, or Firm* — Sughrue Mion, PLLC (57) ABSTRACT

Heavy load pneumatic radial tire according to the present invention includes: tread rubber 6 having laminated structure of cap rubber 5 and base rubber 4; and four or more belt layers 3a-3e disposed radially inward of tread rubber 6. A radially outer side of a width direction side edge of at least one of radially outermost belt layer 3e and widest-width belt layer 3c is covered by reinforcing rubber layer 7 that terminates on a radially inner side of tread rubber 6 without reaching tire equatorial plane E. Relative relation between reinforcing rubber constituting reinforcing rubber layer 7 and base rubber 4 in terms of modulus of rebound elasticity satisfies the condition: reinforcing rubber<base rubber 4.

5 Claims, 4 Drawing Sheets

(51) Int. Cl.
*B60C 11/03* (2006.01)
*B60C 1/00* (2006.01)
*B60C 9/20* (2006.01)

(52) U.S. Cl.
CPC ..... *B60C 11/005* (2013.01); *B60C 2001/0066* (2013.01); *B60C 2001/0075* (2013.01); *B60C 2009/1842* (2013.01); *B60C 2009/1857* (2013.01); *B60C 2011/0025* (2013.01); *B60C 2011/0365* (2013.01); *B60C 2011/0367* (2013.01); *B60C 2200/06* (2013.01); *B60C 2200/065* (2013.01); *Y10T 152/1081* (2015.01)

(58) Field of Classification Search
CPC .... B60C 2009/1842; B60C 2009/1857; B60C 2009/1864; B60C 9/185; B60C 9/18; B60C 11/0041; B60C 11/00; B60C 11/03; B60C 2011/0367
USPC ............ 152/532, 209.5–209.7, 209.18
See application file for complete search history.

(56) References Cited

U.S. PATENT DOCUMENTS

| | | | | |
|---|---|---|---|---|
| 4,425,953 | A | * | 1/1984 | Rohde ............... B60C 9/18 152/532 |
| 4,527,606 | A | * | 7/1985 | Kita .................. B60C 9/18 152/209.5 |
| 4,735,247 | A | | 4/1988 | Makino et al. |
| 5,996,662 | A | * | 12/1999 | Cluzel ............... B60C 9/18 152/532 |
| 6,591,879 | B1 | * | 7/2003 | Beckmann ............. 152/532 X |
| 6,991,014 | B2 | * | 1/2006 | Suzuki ............... B60C 11/00 152/209.5 |
| 7,549,453 | B2 | * | 6/2009 | Ikeda ................. B60C 11/005 152/209.5 |
| 2005/0121128 | A1 | | 6/2005 | Yoshimi et al. |
| 2007/0169870 | A1 | | 7/2007 | Manno et al. |
| 2008/0142132 | A1 | * | 6/2008 | Kleffmann ............ B60C 11/005 152/209.5 |
| 2009/0114331 | A1 | | 5/2009 | Coue |

FOREIGN PATENT DOCUMENTS

| | | | |
|---|---|---|---|
| CN | 101528482 A | | 9/2009 |
| DE | 198 50 766 A1 | * | 5/2000 |
| EP | 0 435 620 A1 | * | 7/1991 |
| EP | 1787825 A1 | | 5/2007 |
| FR | 1.290.294 | * | 3/1962 |
| GB | 2 058 687 A | * | 4/1981 |
| GB | 2 073 110 A | * | 10/1981 |
| JP | 61-135803 A | | 6/1986 |
| JP | 7-132707 A | | 5/1995 |
| JP | 9300911 A | | 11/1997 |
| JP | 2006248305 A | * | 9/2006 |
| JP | 2007-196866 A | | 8/2007 |
| JP | 2008-544912 A | | 12/2008 |
| JP | 2009-52158 A | | 3/2009 |
| JP | 2012106572 A | * | 6/2012 |
| WO | 03/086782 A1 | | 10/2003 |
| WO | 2010/095439 A1 | | 8/2010 |

OTHER PUBLICATIONS

English machine translation of FR 1.290.294, Mar. 5, 1962.*
English machine translation of JP 2006-248305 A, Sep. 21, 2006.*
Communication dated Apr. 14, 2015, issued by the Australian Patent Office in counterpart Australian application No. 2012329419.
Communication dated Oct. 10, 2015 from the State Intellectual Property Office of the People's Republic of China in counterpart application No. 201280052806.4.
Communication dated May 12, 2015 from the Japanese Patent Office in counterpart application No. 2011-234308.
Communication dated Jun. 30, 2015 from the Russian Patent Office in counterpart application No. 2014121086.
International Search Report for PCT/JP2012/006870 dated Feb. 5, 2013.
Communication dated Jul. 14, 2015 from the European Patent Office in counterpart European Application No. 12843345.5.
"Rolling Resistance of Tire" Pneumatic Tire Technology Chapter 5 (6 pages total)—published Apr. 15, 1995.

* cited by examiner

HEAVY LOAD PNEUMATIC RADIAL TIRE WITH CAP TREAD RUBBER, BASE TREAD RUBBER, AND REINFORCING RUBBER LAYER

CROSS REFERENCE TO RELATED APPLICATIONS

This application is a National Stage of International Application No. PCT/JP2012/006870 filed Oct. 25, 2012, claiming priority based on Japanese Patent Application No. 2011-234308 filed Oct. 25, 2011.

TECHNICAL FIELD

The present invention relates to a heavy load pneumatic radial tire suitable for use in heavy load vehicles such as a construction vehicle, and in particular, the present invention proposes a technology for maintaining excellent durability and improving transport efficiency (high-speed driving performance).

BACKGROUND ART

In order to achieve compatibility between durability and transport efficiency at a high level, the conventional technology, for example, (1) configured tread rubber to have a laminated structure of cap rubber and base rubber, the cap rubber having excellent wear resistance, and the base rubber being low heat generation-type rubber, so as to decrease an amount of heat generation of the tread rubber, (2) decreased strain between belt layers, and (3) adopted rubber having excellent fracture resistance in the belt layers.

However, according to the conventional technology, in the event of fracture of rubber occurring at a side edge of a belt composed of the plurality of belt layers, the fracture is likely to progress to the base rubber made of the low heat generation-type rubber that is beyond the belt layers. The likelihood of progression of fracture has been a cause that acts against further improvement in durability of the tire, more directly, the tread rubber.

Figure 6:
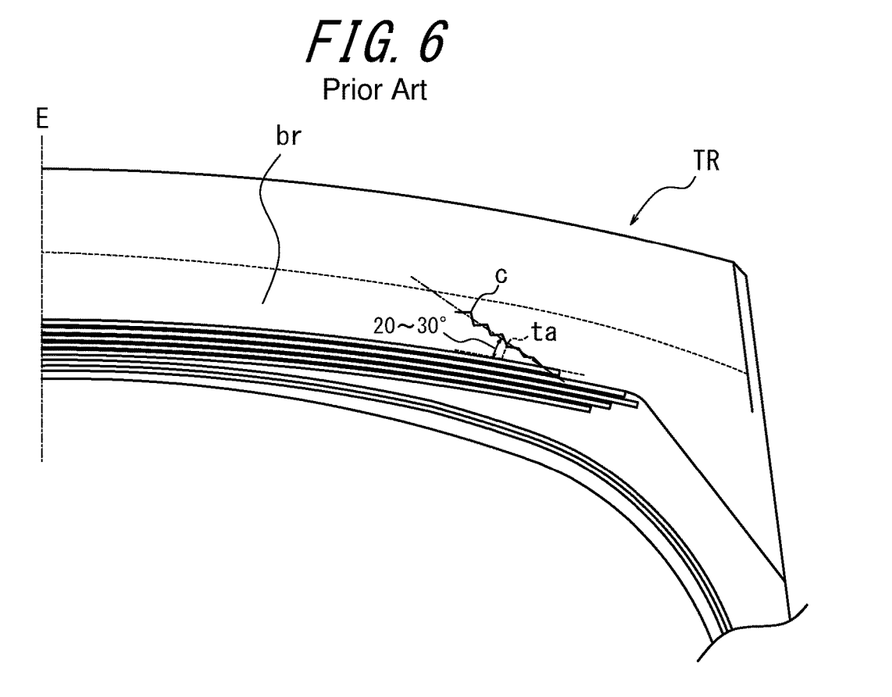
FIG. 6 is a sectional view similar to FIG. 1, illustrating progression of fracture to base rubber in a conventional tire.

That is to say, in rubber, fracture resistance is considered to be incompatible with low heat generation. However, in a radial tire type of the kind that includes a plurality of steel belt layers, for example, due to discrepancy between deformation resulting from a flow of rubber during ground-contact and deformation of the entire belt layers, shearing deformation occurs at the side edge of an outermost belt layer and/or a widest-width belt layer mainly in a tread circumferential direction and in a tread width direction. Accordingly, in the above radial tire, as FIG. 6 illustrates a partial enlarged sectional view of the tread portion in the width direction, for example, fracture c forming an angle of approximately 20°-30° with respect to a tangent line to of a surface of the outermost belt layer progresses from the side edge position of the outermost belt layer to a tire equatorial plane E within low heat generation-type base rubber br. As a result, in the above radial tire, durability of the tread rubber TR is deteriorated at a relatively early stage.

SUMMARY OF INVENTION

Technical Problem

The present invention is to solve the problem as described above involved in the conventional technology. An objective of the present invention is to provide a heavy load pneumatic radial tire that is capable of providing excellent durability by effectively preventing the progression of fracture to the low heat generation-type base rubber that contributes to improve high-speed durability by focusing on the fact that low heat generation-type rubber has a low modulus of elasticity and fracture-resistant rubber or rubber with low resilience (modulus of rebound elasticity) has a high modulus of elasticity.

Solution to Problem

One aspect of the present invention resides in a heavy load pneumatic radial tire comprising: tread rubber that has a laminated structure of wear-resistant cap rubber and low heat generation-type base rubber; and four or more, e.g., six, belt layers with various widths that are disposed radially inward of the tread rubber, wherein a radially outer side of a width direction side edge of at least one, preferably both, of a radially outermost belt layer and a widest-width belt layer among the belt layers is covered by a reinforcing rubber layer configured to terminate on a radially inner side of the tread rubber without reaching a tire equatorial plane, and a relative relation between reinforcing rubber constituting the reinforcing rubber layer and the base rubber in terms of a modulus of rebound elasticity satisfies the following condition: reinforcing rubber<base rubber.

Advantageous Effects of Invention

In the heavy load pneumatic radial tire according to the present invention, the radially outer side of the width direction side edge of at least one of the radially outermost belt layer and the widest-width belt layer is covered by the reinforcing rubber layer made of fracture-resistant rubber having a higher modulus of elasticity than low heat generation rubber, that is to say, the reinforcing rubber having a smaller modulus of rebound elasticity than the low heat generation base rubber. Accordingly, various types of shearing deformation at the side edge of the belt layer per se, which is attributed to discrepancy between deformation resulting from a flow of rubber during ground-contact and deformation of the entire belt layers, is advantageously prevented by the reinforcing rubber layer with a high modulus of elasticity that covers the side edge of the belt layer. As a result, occurrence of fracture in the rubber at the side edge of the belt layer per se is mitigated, and by effectively preventing progression of occurring fracture to the base rubber, durability of the belt is significantly improved.

Furthermore, in the heavy load pneumatic radial tire according to the present invention, the reinforcing rubber layer made of the reinforcing rubber having a high modulus of elasticity is configured to terminate without reaching the tire equatorial plane. Accordingly, the low heat generation base rubber is allowed to fully exert the original function, thereby allowing a decrease in the amount of heat generation of the entire tread rubber. As a result, even when the tire undergoes high-speed rotation, heat generation of the tread rubber is effectively prevented, and high-speed driving performance, and accordingly, improved transport efficiency is guaranteed.

Moreover, in the tire, particularly, the relative relation in terms of the modulus of rebound elasticity is defined by the following condition:

reinforcing rubber<base rubber.

Accordingly, compatibility between resistance against heat generation of the tire and durability of the belt is achieved at a high level.

BRIEF DESCRIPTION OF THE DRAWING

The present invention will be further described below with reference to the accompanying drawings, wherein.

DESCRIPTION OF EMBODIMENTS

The following describes the present invention in detail with reference to the drawings.

Figure 1:
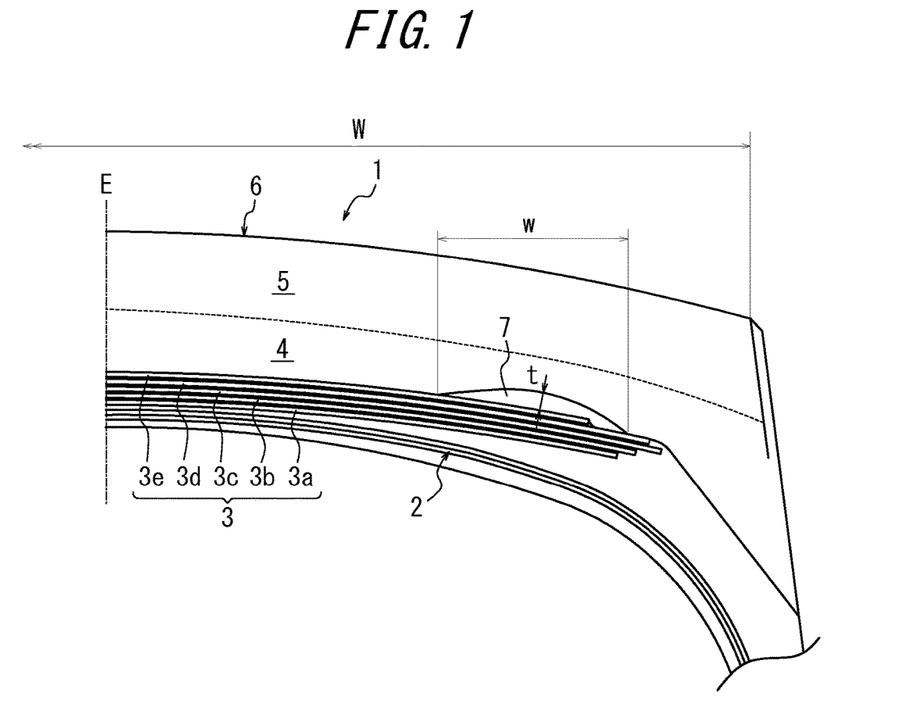
FIG. 1 is a partially enlarged sectional view in a tread width direction of a half part of a tread portion of a tire according to the present invention when the tire is mounted to an application rim, inflated with a specified air pressure, and applied with a load corresponding to a maximum load capacity.

In a tire according to an embodiment illustrated in FIG. 1, reference numeral 1 in the figure refers to a tread portion, and reference numeral 2 refers to a radial carcass composed of one or more carcass plies extending toroidally between one bead core (not illustrated) and another bead core (not illustrated). Reference numeral 3 refers to a belt composed of four or more belt layers, five laminated belt layers $3a$-$3e$ in the figure, disposed on an outer circumferential side of a crown region on a radially outer side of the radial carcass 2.

Cords of one belt layer extend in a direction crossing cords of another belt layer adjacent to the one belt layer. In particular, as seen from a radially innermost layer, with respect to a tire equatorial plane E, the cords of the first belt layer $3a$ preferably extend in a direction opposite to the cords of the second belt layer $3b$, and the cords of the fourth belt layer $3d$ preferably extends in a direction opposite to the cords of the fifth belt layer $3e$.

On a radially further outer side of the belt 3, there is also provided tread rubber 6 having a laminated structure of base rubber 4 and cap rubber 5 positioned on a radially outer side of the base rubber 4. The tread rubber 6 is provided, on a surface of the cap rubber 5 thereof, with a desired tread pattern (e.g. width direction grooves extending in a tread width direction).

In such a tire, at least one of a radially outermost belt layer, namely, the belt layer $3e$ in the figure, and a widest width belt layer, namely, the belt layer $3c$ in the figure, is covered by a reinforcing rubber layer 7. In the figure, a radially outer side of a width direction side edge of the radially outermost belt layer $3e$ is covered by the reinforcing rubber layer 7. Note that the reinforcing rubber layer 7 terminates on a radially inner side of the tread rubber 6 without reaching the tire equatorial plane E and without reaching the tire outer side surface, and a width direction outermost end of the reinforcing rubber layer 7 furthest away from the tire equatorial plane E is positioned inward of an outermost end of the widest width belt layer $3c$ in the width direction of the tire. A relative relation between reinforcing rubber constituting the reinforcing rubber layer 7, the base rubber 4, and the cap rubber 5 in terms of a modulus of rebound elasticity preferably satisfies the following condition:

reinforcing rubber≤cap rubber<base rubber.

The modulus of rebound elasticity may be obtained by a Lupke rebound resilience test in accordance with JIS K6255-1996.

Preferably, a portion of the reinforcing rubber layer 7 having a maximum thickness is positioned inward in the tread width direction than a position of the width direction side edge of each of the radially outermost belt layer $3e$ and the widest-width belt layer $3c$. With the above structure, fracture of rubber that might progress from the side edge position of the belt layer $3c$ or the belt layer $3e$ toward the tire equatorial plane within the base rubber 4 is effectively prevented in accordance with an increase in thickness of the reinforcing rubber layer 7 having a high modulus of elasticity. That is to say, against the fracture of rubber, the base rubber 4 is effectively protected by the reinforcing rubber layer 7. In order to prevent concentration of the tensile stress on the reinforcing rubber layer or the like, the thickness of the reinforcing rubber 7 per se is preferably increased gradually from the side edge position toward the portion having the maximum thickness.

The modulus of rebound elasticity of the reinforcing rubber constituting the reinforcing rubber layer 7 obtained as described above is preferably set to be 70% or less, and more preferably set to be 65% or less. By doing so, the modulus of elasticity of the reinforcing rubber layer 7 is more effective for preventing the progression of fracture of rubber. That is to say, when the modulus of rebound elasticity is more than 70%, the progression of fracture might not be sufficiently prevented.

Meanwhile, width w of the reinforcing rubber layer 7 is preferably in the range of 15-25% of width W of a tread surface. When the tire includes a width direction groove that extends in the tread width direction through a position at ¼ the width of a half-width of the tread surface from an outer end of the width W of the tread surface to the tire equatorial plane E in the tread width direction, the maximum thickness t of the reinforcing rubber layer 7 is preferably in the range of 7-15% of a groove depth of the width direction groove present in the position at ¼ the width of the half-width of the tread surface from the outer end of the width W of the tread surface to the tire equatorial plane E in the tread width direction. With the above structures, the reinforcing rubber layer 7 effectively prevents the progression of fracture to the base rubber 4, and the low heat generation-type base rubber 4 is allowed to fully exert the original function, thereby effectively decreasing the amount of heat generation of the tread rubber 6. That is to say, the tread rubber 6 is provided with high durability.

In this regard, if the width w of the reinforcing rubber layer 7 is less than 15% of the width W of the tread surface, variation in direction of the progression of fracture to the base rubber 4 might not be coped with. If the width w of the reinforcing rubber layer 7 is more than 25% of the width W of the tread surface, there is a probable risk of increase in the amount of heat generation due to lack of volume in the base rubber 4.

If the thickness of the reinforcing rubber layer 7 is less than 7% of the groove depth of the width direction groove, it is difficult to allow the reinforcing rubber layer 7 to effectively exert the function of preventing the progression of fracture. If the thickness of the reinforcing rubber layer 7 is more than 15% of the groove depth of the width direction groove, there is a probable risk of increase in the amount of heat generation of the tread rubber.

Additionally, regarding the "groove depth of the width direction groove", in a so-called OR tire, generally, the groove depth of a width direction groove is measured in a "position at ¼ the width of a half-width of the tread surface from an outer end of the width W of the tread surface to the tire equatorial plane E in the tread width direction". When a stepped portion is present in the position, a groove depth measured by excluding the position is regarded as the "groove depth of the width direction groove." The description herein follows the above custom. In many cases, some sorts of indicators for the "groove depth" are present.

In the description and claims, the "width of the tread surface" refers to the ground-contact width of the tread. The "ground-contact width of the tread" means a direct distance that is parallel to a tire axis line between outermost ground-contact positions (ground-contact ends) in the tire axis direction when the tire is mounted to the application rim, inflated with the specified air pressure, and disposed on a flat board vertically at a camber angle of zero degree, and applied with the load corresponding to the maximum load capacity.

In this case, the "application rim" refers to any of rims specified in the standards described below in accordance with the size of tire. The "specified air pressure" refers to an air pressure specified in the standards below in accordance with the maximum load capacity. The "maximum load capacity" refers to maximum mass that may be applied to the tire according to the standards below.

The air herein may also be replaced with inert gas such as nitrogen gas and other gas.

The "standards" refer to industrial standards valid in regions where tires are manufactured and used. Examples of such industrial standards include YEAR BOOK of THE TIRE and RIM ASSOCIATION INC. in the United States, STANDARDS MANUAL of THE European Tyre and Rim Technical Organization in Europe, and JATMA YEAR BOOK of The Japan Automobile Tire Manufacturers Association in Japan.

Figure 2:
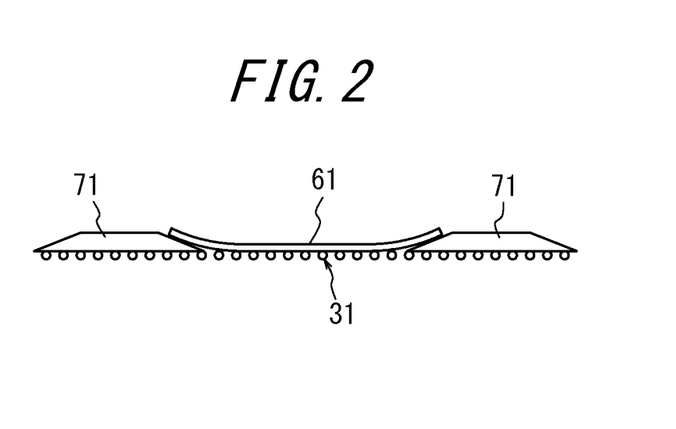
FIG. 2 is a sectional view in a tread width direction illustrating a preset state of a reinforcing rubber member and an unvulcanized rubber sheet member on a belt member composed of a plurality of belt layer materials.

A product tire with the aforementioned structures may be manufactured, for example, by presetting unvulcanized tire structural members as illustrated in FIG. 2 and laminating other required tire components on the preset structure attached to a circumferential surface of a molding drum.

Presetting of the tire components is performed as follows.

As FIG. 2 illustrates a sectional view in the width direction of a preset state of the unvulcanized tire structural members, for example, in each of regions covering width direction side edges of the belt material that are on an upper surface of a flat belt member 31 composed of five layers of a belt layer material laminated each other and that constitute the radially outermost belt layer 3e, a strip-shaped reinforcing rubber layer material 71 is disposed such that the respective reinforcing rubber layer materials 71 are adhered linearly and parallel to each other with space therebetween. Subsequently, for example, a flat unvulcanized rubber sheet member 61, which may be made of a tread under cushion material, a tread rubber material, or the like, is laminated by adhesion on the entire exposed portion of the upper surface of the belt member 31 to cross over the strip-shaped reinforcing rubber layer materials 71.

Figure 3:
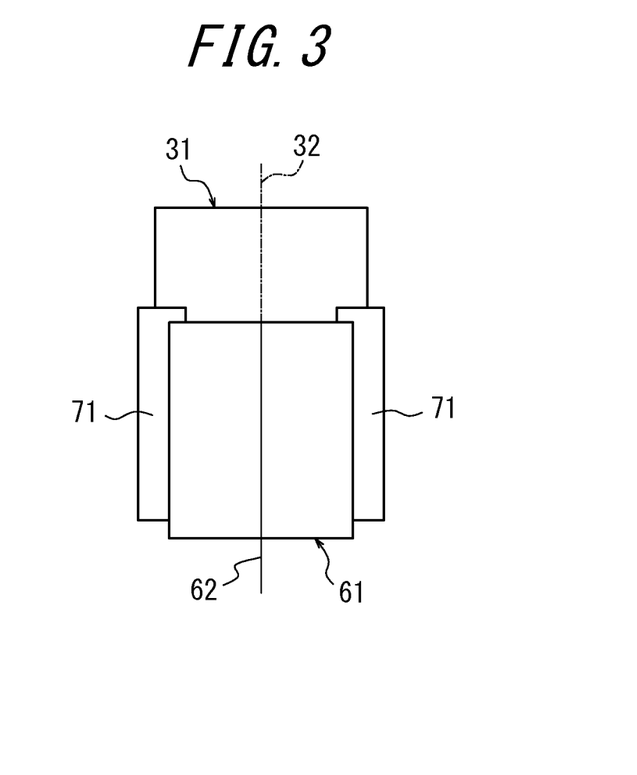
FIG. 3 is a partial development plan view illustrating the preset state of FIG. 2, with the members being fractured and removed in part.

As illustrated in a partial development plan view of FIG. 3, such a preset structure may be appropriately configured by attaching the unvulcanized rubber sheet member 61 onto the belt member 31 while a mark line 32 formed in a required position, e.g., a widthwise middle position, of the belt member 31 to extend linearly in a direction in which the belt member 31 extends is in alignment with a linear mark line 62 formed in a required position of the unvalcanized rubber sheet member 61 in a similar manner.

Figure 4:
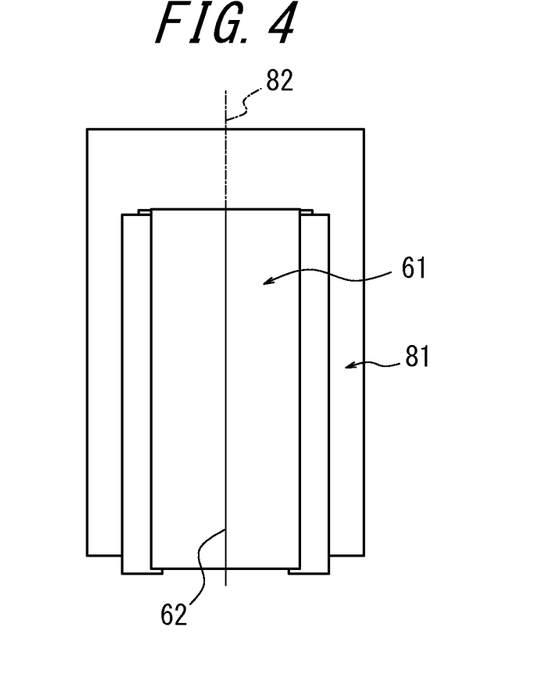
FIG. 4 is a partial development plan view illustrating how the preset tire components are attached to a molding drum.

Furthermore, as illustrated in a partial development plan view of FIG. 4, for example, by aligning the mark line 62 formed on the unvulcanized rubber sheet member 61 with a linear target line 82 formed on the circumferential surface of the molding drum 81, the preset structure is attached to the circumferential surface of the molding drum which may be a belt-tread molding drum or the like. Accordingly, the preset structure is always attached and positioned on the drum 81 in a desired manner, and as a result, other required tire components may be laminated on the preset structure with high precision and accuracy.

In this regard, the positions in which the mark lines 32 and 62 and the target line 82 are formed are not limited to the widthwise middle position and the axis-direction middle position of the drum 81 or the like and may be appropriately chosen as required, providing that the positions are not affected by expected variation in various width dimensions, side edge position, and the like.

The laminaton by adhesion of the unvulcanized rubber sheet member 61 to the exposed portion on the upper surface of the belt member 31 in a desired manner as illustrated in FIG. 3 is facilitated as follows, for example.

Figure 5:
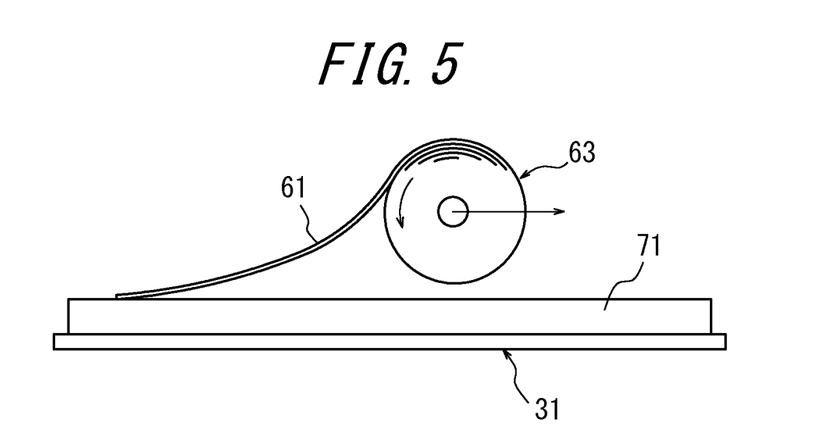
FIG. 5 is a schematic side view illustrating a preset state of an unvulcanized rubber sheet member.

As illustrated in FIG. 5, while a roll 63 wound with the unvulcanized rubber sheet member 61 is being horizontally displaced in a direction in which the unvulcanized rubber sheet member 61 is to be attached, the unvulcanized rubber sheet member 61 is delivered. Alternatively, under a halt of the winding roll 63, while the belt member 31 and the strip-shaped reinforcing rubber layer material 71 are being horizontally displaced in a direction in which the unvulcanized rubber sheet member 61 has been already attached, the unvulcanized rubber sheet member 61 is delivered from the roll 63. In this case, alignment between the mark lines 32 and 62 may be achieved accurately enough by at least one of horizontal displacement of the winding roll 63 in the central axis direction and horizontal displacement of an attachment body of the belt member 31 and the strip-shaped reinforcing rubber layer materials 71 in the width direction.

EXAMPLES

Conventional tire that has a size of 53/80R63 and that is not arranged with a reinforcing rubber layer, and Example tires and Comparative Example tire arranged with a reinforcing rubber layer whose width, maximum thickness, and modulus of rebound elasticity are determined as parameters were manufactured. The specifications of Example tires and Comparative Example tire are shown in Table 1. For each of the tires, a drum heat generation test of the tread rubber, and an outermost-belt-layer durability drum test for measuring a length of a crack generated from the side edge position of the radially outermost belt layer.

TABLE 1

|  | Reinforcing rubber | | Modulus of rebound elasticity of base rubber (%) | Modulus of rebound elasticity of cap rubber (%) |
|---|---|---|---|---|
|  | Width w/W (%) | Maximum thickness t/groove depth (%) | Modulus of rebound elasticity (%) | | |
| Conventional tire | N/A | N/A | — | 72 | 68 |
| Comparative Example tire | 25 | 15 | 72 | 68 | 68 |
| Example tire 4 | 10 | 5 | 68 | 72 | 68 |
| Example tire 5 | 25 | 25 | 68 | 72 | 68 |
| Example tire 1 | 15 | 7 | 68 | 72 | 68 |
| Example tire 2 | 25 | 15 | 68 | 72 | 68 |
| Example tire 3 | 25 | 15 | 65 | 72 | 68 |

In the present examples, the drum heat generation test was conducted as follows. Each sample tire was inflated at an internal pressure of 600 kPa, applied with a load of 825 kN, and was subject to rotation under load at a speed of 8 km/h on a drum with a diameter of 5 m, and after 24 hours passed, the temperature of the belt was measured in the arrangement position of the reinforcing rubber layer or a position corresponding to the arrangement position. By using the measured temperature of Conventional tire as a standard and obtaining an increase/decrease value with respect to the standard temperature, heat generation property was evaluated.

The outermost-belt-layer durability drum test was conducted in such a manner that the internal pressure and the load condition were set similarly to the above, and each tire, being at a camber angle of 3.0°, was subject to rotation under load for 480 hours at a speed of 8 km/h on a drum with a diameter of 5 m. Then, by measuring the length of the crack generated from the side edge of the outermost belt layer, durability was evaluated.

The results are shown in Table 2.

TABLE 2

|  | Heat generation test result (° C.) | Durability test result (mm) |
|---|---|---|
| Conventional tire | Standard | 51 |
| Comparative Example tire | +18 | 54 |
| Example tire 4 | +0.5 | 48 |
| Example tire 5 | +4.7 | 39 |
| Example tire 1 | +1.3 | 39 |
| Example tire 2 | +2.2 | 23 |
| Example tire 3 | +3.1 | 15 |

As shown in Table 2, any of Example tires clearly reduces increase in temperature due to heat generation to a sufficiently small degree and significantly reduces the progression length of the crack compared with Conventional tire.

REFERENCE SIGNS LIST 1 tread portion
2 radial carcass
3 belt
3a-3e belt layer
4 base rubber
5 cap rubber
6 tread rubber
31 belt member
32, 62 mark line
61 unvulcanized rubber sheet member
63 roll
71 reinforcing rubber layer material
81 molding drum
82 target line
E tire equatorial plane
w width of reinforcing rubber layer
W width of tread surface
t maximum thickness of reinforcing rubber layer

The invention claimed is:

1. A heavy load pneumatic radial tire comprising:
tread rubber that has a laminated structure of cap rubber and base rubber; and four or more belt layers that are disposed radially inward of the tread rubber, the four or more belt layers including a radially outermost belt layer and a widest-width belt layer among the belt layers, wherein: a radially outer side of a width direction side edge of the radially outermost belt layer is covered by a reinforcing rubber layer configured to terminate on a radially inner side of the tread rubber without reaching a tire equatorial plane, and
a relative relation between reinforcing rubber constituting the reinforcing rubber layer and the base rubber in terms of a modulus of rebound elasticity (%) satisfies the following condition:

reinforcing rubber<base rubber, wherein a width (w) of the reinforcing rubber layer is within the range of 15-25% of a width (W) of a tread surface,
wherein the reinforcing rubber layer is configured to terminate along a width direction of the tire without reaching the tire outer side surface, and
wherein a width direction outermost end of the reinforcing rubber layer farthest away from the tire equatorial plane is positioned inward of an outermost end of the widest-width belt layer among the belt layers in the width direction of the tire.

2. The heavy load pneumatic radial tire according to claim 1, wherein a portion of the reinforcing rubber layer having a maximum thickness is positioned inward in a tread width direction than a position of the width direction side edge of the radially outermost belt layer.

3. The heavy load pneumatic radial tire according to claim 1, wherein the modulus of rebound elasticity of the reinforcing rubber constituting the reinforcing rubber layer is 70% or less.

4. The heavy load pneumatic radial tire according to claim 1, further comprising:
a width direction groove that extends in the tread width direction through a position at ¼ width of a half-width of the tread surface from an outer end of the width (W) of the tread surface to the tire equatorial plane in the tread width direction, wherein
a maximum thickness (t) of the reinforcing rubber layer is within a range of 7-15% of a groove depth of the width direction groove measured in the position at ¼ width of the half-width of the tread surface from the outer end of the width (W) of the tread surface to the tire equatorial plane in the tread width direction.

5. The heavy load pneumatic radial tire according to claim 1, wherein a portion of the reinforcing rubber layer having a maximum thickness is positioned inward in a tread width direction than a position of the width direction side edge of the radially outermost belt layer, and wherein a thickness of the reinforcing rubber layer increases gradually from each side edge position along the width direction of the tire toward the portion having the maximum thickness.

* * * * *